Figure 1:
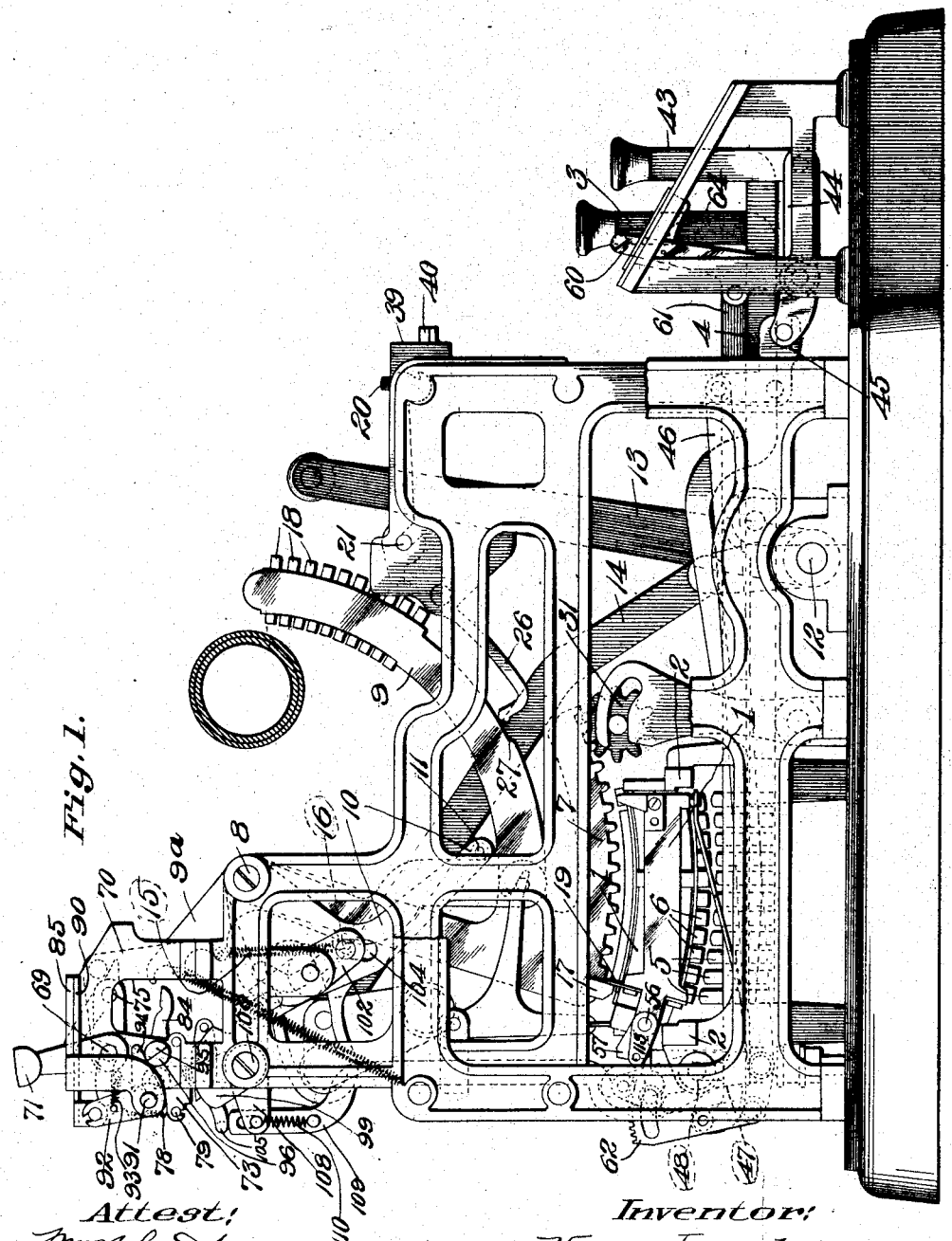

H. LANDSIEDEL.
ADDING AND RECORDING MACHINE.
APPLICATION FILED APR. 19, 1912.

1,209,857.

Patented Dec. 26, 1916.
9 SHEETS—SHEET 1.

Attest:
Wm H Scott
L C Kingsland

Inventor:
Harry Landsiedel,
by J D Rippey atty.

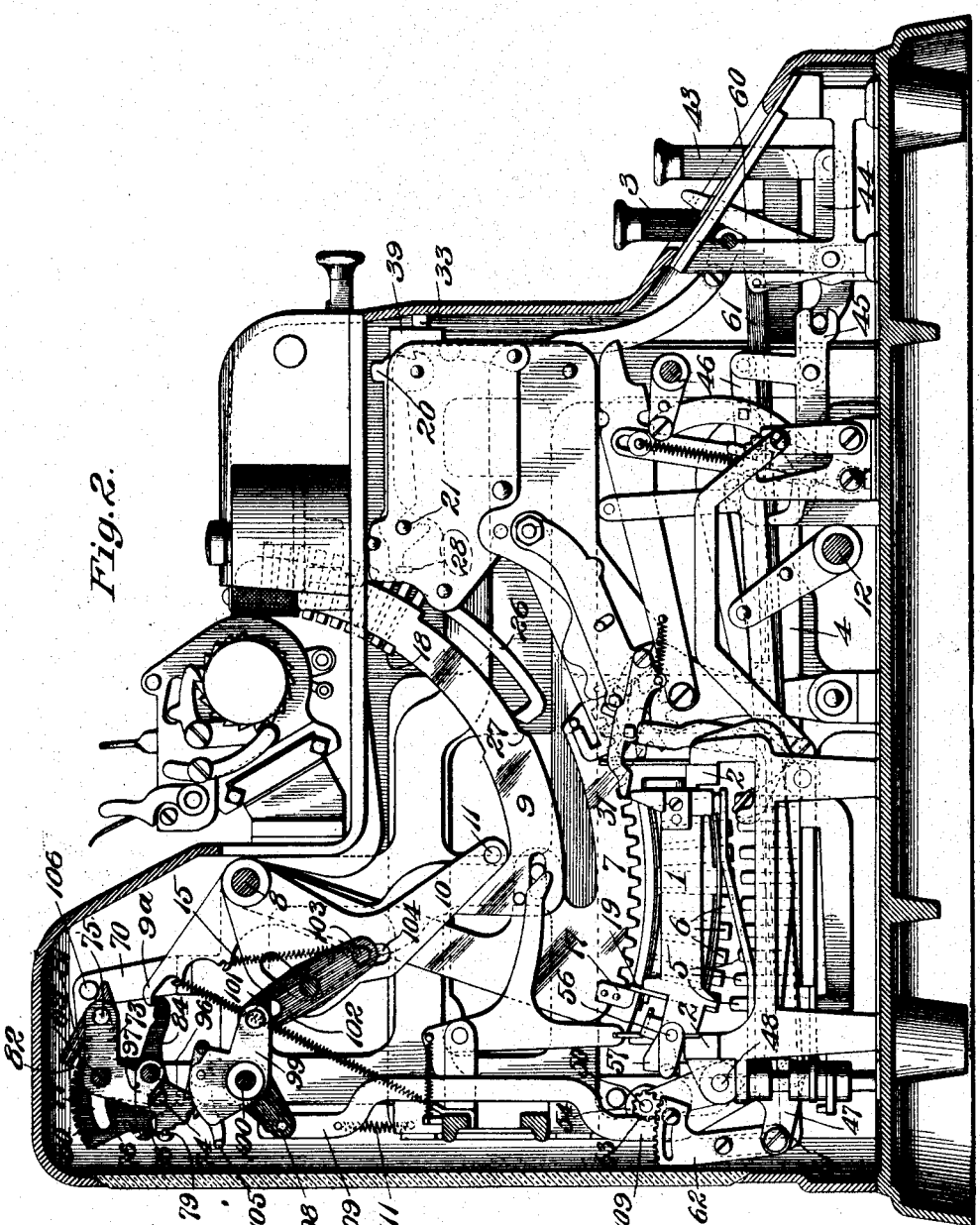

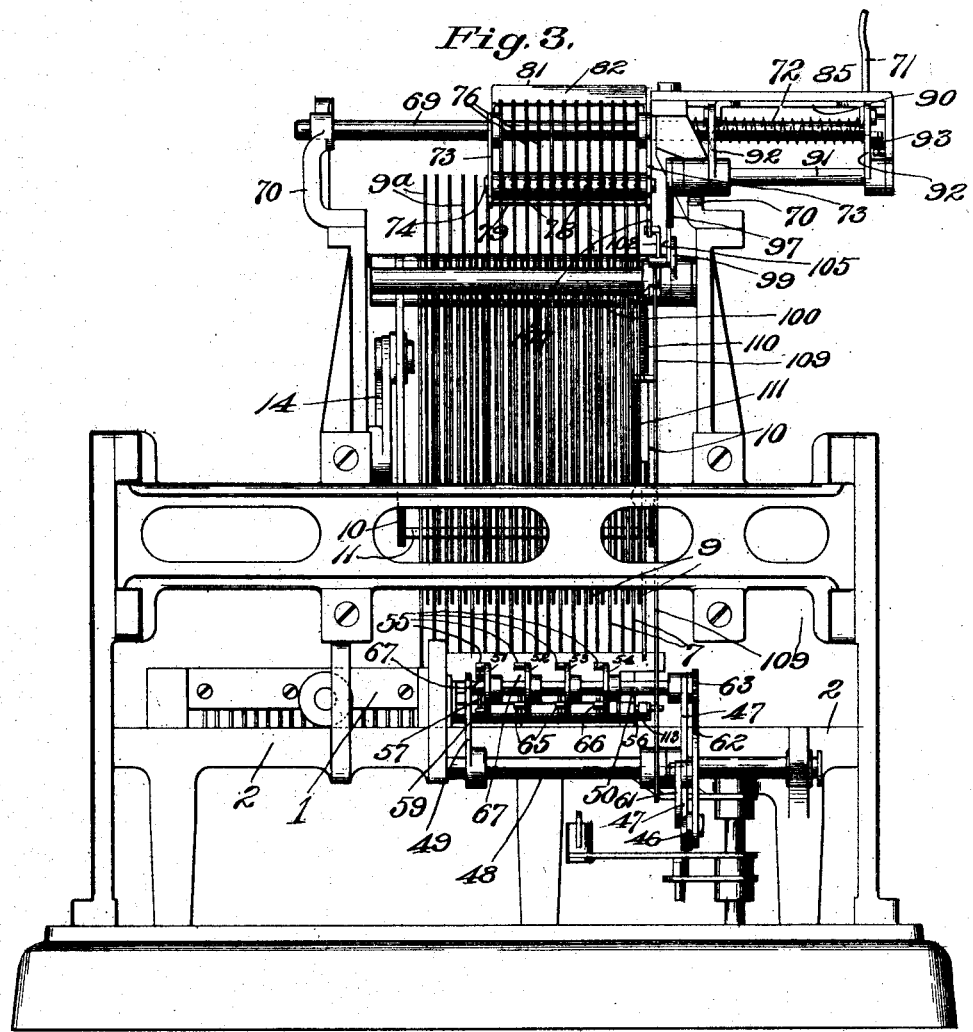

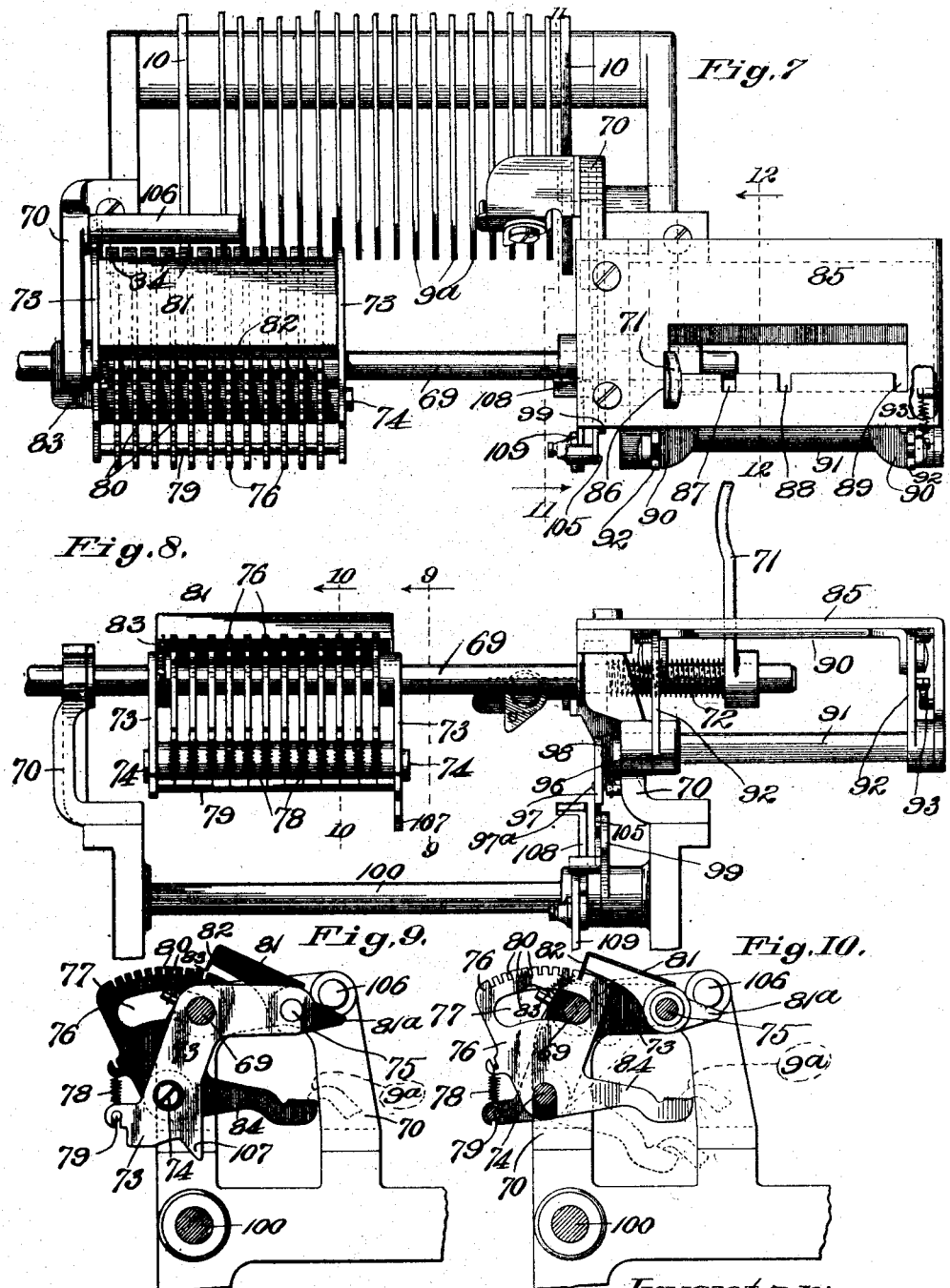

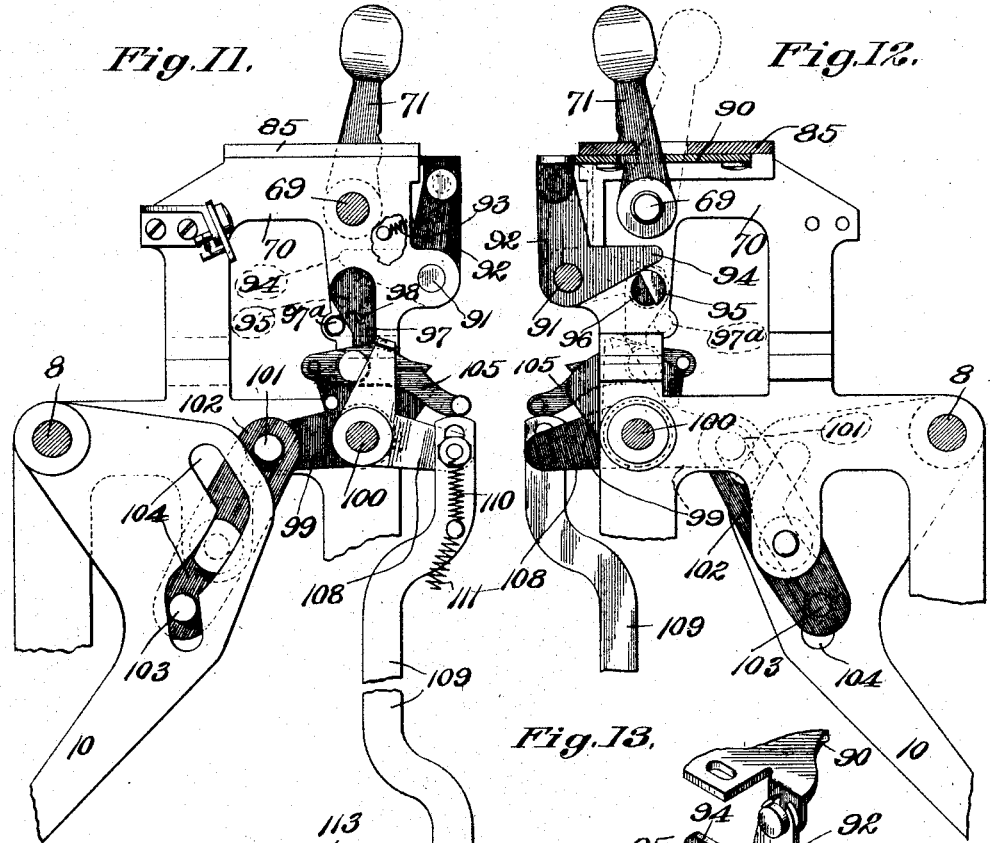

H. LANDSIEDEL.
ADDING AND RECORDING MACHINE.
APPLICATION FILED APR. 19, 1912.

1,209,857.

Patented Dec. 26, 1916.
9 SHEETS—SHEET 6.

Attest:
Wm H Scott
L C Kingland

Inventor:
Harry Landsiedel,
by J. D. Rippy Atty.

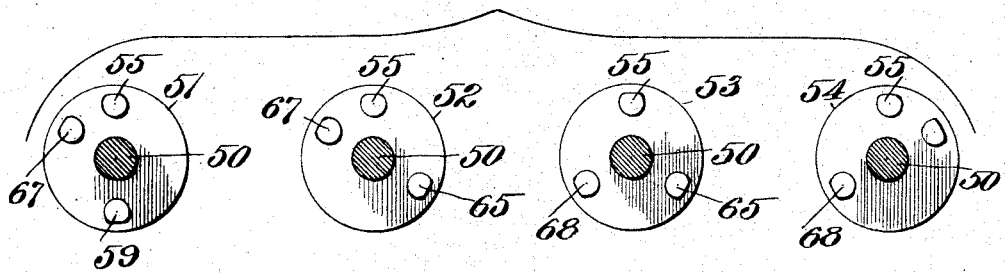
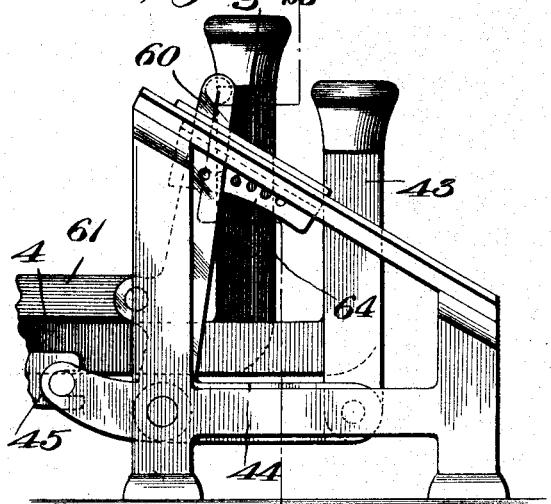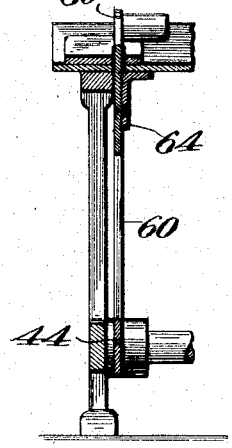
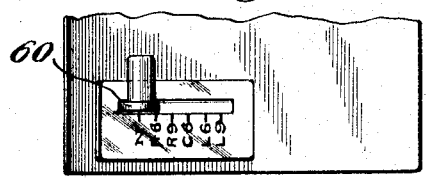

H. LANDSIEDEL.
ADDING AND RECORDING MACHINE.
APPLICATION FILED APR. 19, 1912.

1,209,857.

Patented Dec. 26, 1916.

Attest:
Wm. H. Scott
L. C. Kingsland

Inventor:
Harry Landsiedel,
by J. D. Rippey, Atty.

H. LANDSIEDEL.
ADDING AND RECORDING MACHINE.
APPLICATION FILED APR. 19, 1912.

1,209,857.

Patented Dec. 26, 1916.
9 SHEETS—SHEET 9.

Attest:
Wm. H. Scott
L. C. Kingsland

Inventor:
Harry Landsiedel,
by J. D. Rippey
Atty.

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING AND RECORDING MACHINE.

1,209,857.   Specification of Letters Patent.   Patented Dec. 26, 1916.

Application filed April 19, 1912. Serial No. 692,215.

*To all whom it may concern:*

Be it known that I, HARRY LANDSIEDEL, a citizen of the United States, residing at Poplar Bluff, in the county of Butler and State of Missouri, have invented new and useful Improvements in Adding and Recording Machines, of which the following is a specification enabling those skilled in the art to which my invention appertains to understand the same.

This invention relates to adding and recording machines, and an object is to equip the machine with mechanism whereby a number or total added or recorded in one column or space may be set up or represented and then added or recorded, or both added and recorded in another column or space. In the embodiment shown these operations and results are effected and accomplished without lateral movement of the adding mechanism or of the recording mechanism, and, if desired, without lateral movement of the paper receiving the records.

Another object is to provide an adding and recording machine having a capacity for adding and recording numbers of large denominations, with provisions for separating or splitting the recording and adding mechanisms so that parallel columns of numbers may be simultaneously added and recorded; in combination with mechanism for clearing the adding mechanism for one or more of the columns, while retaining the total in that part of the adding mechanism in any other column or columns.

A further object is to provide an adding and recording machine having a capacity for adding and recording numbers of large denominations, with provision for dividing or separating or splitting the recording and adding mechanisms so that parallel columns of numbers may be simultaneously added and recorded; in combination with mechanism for clearing the adding mechanism for one of the columns, while retaining the total in that part of the adding mechanism in any other column or columns; and mechanism settable incidentally to any clearing operations to represent the total cleared; and means whereby said settable mechanism may be caused to coöperate with the adding mechanism of a column separate from the one cleared effectively to cause and permit said separate part of the adding mechanism to add the total previously cleared. This permits one part of the adding mechanism,—that is, the adding mechanism for one column,—to be separated to produce a series of totals or sub-totals and to be cleared after each total or sub-total is obtained; and the transfer of the total or subtotal so obtained and cleared, to the adding mechanism of another column, so that a grand total may be obtained in the last named adding mechanism.

There are other objects to be attained by my present invention, and I have not attempted to mention all of them, but refer to the following description and to the drawings illustrating the invention and some of the work and results performed thereby, and believe that many other objects and advantages will be apparent therefrom.

Figure 15:
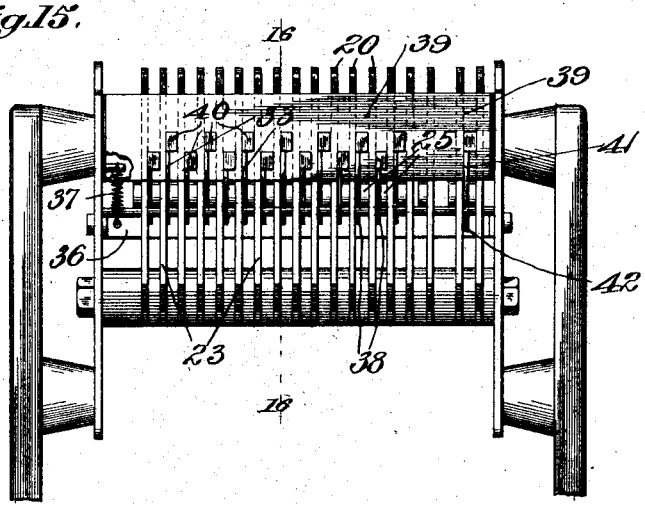
Figure 16:
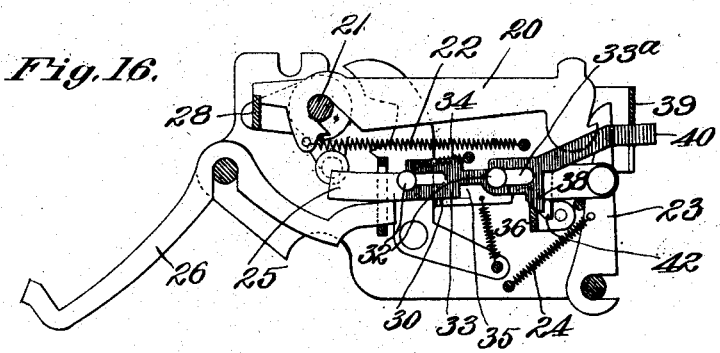
Figure 17:
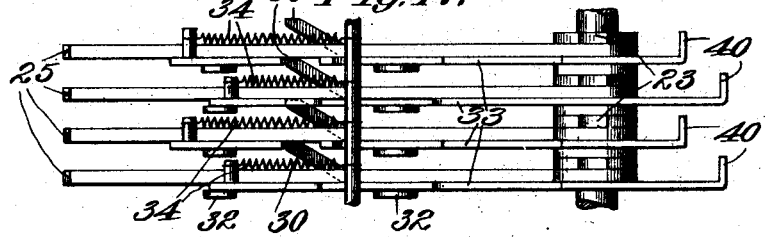

In the accompanying drawings in which I have illustrated one embodiment of my invention Figure 1 is a side elevation of a "Dalton" adding machine having my invention embodied therein, and made a coöperating part thereof, it being understood that the usual case of the machine is removed. Fig. 2 is a longitudinal sectional view of the machine equipped with my invention. Fig. 3 is a rear elevation. Fig. 4 is a detail view in section, showing the stop or detaining device which holds the type-carriers and racks which operate the adding mechanism, and showing also the device for releasing the stop to permit the printing of a total represented in the adding mechanism, and to permit operation of the racks in introducing a total or subtotal from one part or column of the adding mechanism to another part or column. Fig. 5 is a view of the same parts shown in Fig. 4, showing the stop or detaining device in the position to which it is moved by the total key connections when said key is operated preliminarily to the operation of printing a total, or clearing any part or column group of the adding mechanism. Fig. 6 is a rear elevation showing the sections of the detaining or stop device for the type-carriers and the racks, these sections being under control of the operator so that the adding and recording mechanisms may be operated in groups or separate columns, only the required groups or columns being released. Fig. 7 is a plan view of the transfer carriage which contains the mechanism which is settable at the will of the operator to represent a number or total or sub-total added or recorded by any part or column-mechanism of the machine, said mechanism being adjustable after being set so that it will coöperate with the adding and recording mechanism for any other column effectively to permit recording and adding in said other column of the number represented by said settable (set) mechanism; the view shows this mechanism as observed from a position at the rear of the machine. In this view of the drawing the transfer carriage and the settable mechanism therein are in position to be set to represent a number of six orders or figures. Fig. 8 is a rear elevation of the same mechanism in a different position or adjustment, that is, in position for operation to represent a number having nine figures or orders. Fig. 9 is a sectional view on a line 9—9 of Fig. 8 showing the latch plate released from the other parts which it controls in the carriage. Fig. 10 is a sectional view on a line 10—10 of Fig. 8 showing the latch plate in engagement with the parts which it controls in the carriage. Fig. 11 is a sectional view on the line 11—11 of Fig. 7 and illustrates the devices for holding and releasing the transfer carriage. Fig. 12 is a sectional view on the line 12—12 of Fig. 7 showing other details of the mechanism controlling the transfer carriage. Fig. 13 is a perspective view, plainly illustrating the details of the latch mechanism controlling the transfer carriage constituting the column transfer mechanism. Fig. 14 is a perspective view of the device which is manipulative effectively to separate or split the recording and adding mechanisms into separate columns, or groups operable to produce separate columns of items with their totals and sub-totals. Fig. 15 is a front view of the devices for separating or "splitting" the train of type-driving devices, or hammers, into separate columns or groups operable to record separate columns of items. Fig. 16 is a sectional view on a line, such as the line 16—16 of Fig. 15, showing the details of the "splitting" mechanism for the hammers. Fig. 17 is a diagrammatic view showing the arrangement of the manipulative couplings for the type-driving devices or hammers. Fig. 18 is a diagrammatic view of the four elements used in the present embodiment, for selectively releasing the type-carriers to record one or more columns of items, as desired. Fig. 19 is an enlarged view of the connections in the key-board for operating said elements selectively to enable one or more columns to be recorded, as desired. Fig. 20 is a sectional view on the line 20—20 of Fig. 19. Fig. 21 is a plan view of part of the key-board, showing the various positions in which the key or lever may be adjusted to control the type-carrier release mechanism. Fig. 22 is an illustration of an example in which the adding and recording units or trains of units to the highest order are coöperatively related. Fig. 23 illustrates an example produced by dividing or "splitting" the machine into two separate sections or columns, each of which has a capacity of listing and adding numbers containing nine orders. Fig. 24 represents three parallel columns of items listed and added at one operation, and the totals of two of the columns being transferred to and added in the third column and the combined total being given. Fig. 25 shows two parallel columns of items, simultaneously added and recorded, and the totals thereof transferred to a third column in which they are separately recorded, and in which they are added and their combined total is given. Fig. 26 illustrates an example performed by the machine, in which the machine is divided for three parallel columns; two columns of items being added, and the different sub-totals from one column being transferred to and listed in the third column; the second column having its sub-totals retained and added together to produce a grand total of the items in said second column. Fig. 27 shows an example performed by the machine when the second and third columns are coöperatively controlled. Fig. 28 shows an example of sub-totals transferred from the first column to the third column.

I have shown my invention embodied in a "Dalton" adding machine, though I do not restrict myself (nor do I intend or contemplate that the claims shall be construed so restricted) to its use in, or in combination with, a machine of that or any other specific type, since it is obvious that the invention may, with great advantage, be combined with other species of adding machines. The "Dalton" adding machine is constructed in substantial accordance with the adding department constituting a part of the subject-matter of the application of Hubert Hopkins, filed January 24, 1903, and having Serial Number 140390, and eventuating in Patent No. 1,039,130, dated September 24, 1912. Said machine includes a carriage 1 (Fig. 1) arranged to travel upon rails 2. A series of numeral keys 3 have levers 4 terminating in a row of hammers 5, and are operable to cause said hammers to raise or set up the pins 6 in the carriage. This operation of setting up the pins is also described and is known as the operation of "setting up numbers", since the pins so set up do actually represent, in a mechanical sense, the numbers struck on the keys. The operations of the keys in setting up numbers in the carriage causes said carriage to move laterally on the rails 2 as required to position the set-up pins in proper numerical orders under the swinging racks 7. The racks 7 are suspended from a shaft 8, and each rack is connected to an arcuate type-carrier 9, which type-carriers also swing from the shaft 8. Arms 10 also swing from the shaft 8 and these arms support a rod 11 which extends transversely in front of the vertical portions of the racks and type-carriers, and is effective to hold said racks and type-carriers in their retracted or idle position. Said arms and rod may also be swung forwardly to permit forward movement of the racks and type-carriers, and rearwardly to restore said racks and type-carriers to idle position after each forward operation by operating a rock shaft 12, which is equipped with a handle 13 for manual operation. Said shaft is connected with one of the arms 10 by a link 14 whereby operation of the shaft, by the handle 13 or otherwise, will swing the arms 10 and the rod 11 back and forth effectively to cause reciprocation of the racks 7 and the type-carriers 9. A retractile spring 15 connects a rearwardly extended portion of each type-carrier with a rod or bar 16, so that when the rod 11 is swung forwardly the type-carriers and racks 11 will be actuated by said springs. The racks 7 have heel pieces 17 which engage against the pins 6 previously set up by the keys, and thereby stop forward movement of the type-carriers and racks so that at each operation of said type-carriers and racks the number, which had been struck on the keys and thereby set up in the carriage 1, will be designated at a printing line by the type 18 on the type-carriers. The racks and type-carriers which are above the highest order of the number to be added or recorded are prevented from movement by the engagement of the heels 17 with movable latch plates 19 hereinafter more particularly described. Since said latch plates are in the carriage 1, and in front of all the heels 17 when the carriage is in idle position, it follows that, when the carriage moves from order to order by the operation of setting up a number, one rack and type-carrier for each order of the number set up in the carriage will be released. This operation is well known in the "Dalton" machine, and in all essential respects is like the operation of the pin carriage in the Hopkins application and in the British patent previously mentioned.

The "Dalton" machine and the machine of Patent No. 1,039,130 aforesaid also contains a series of type-driving hammers so pivoted upon a shaft 21 (Figs. 1 and 16) and actuated by springs 22 that they will strike the type positioned at the printing line in the manner previously described. There is one hammer for each type-carrier, and each hammer is provided with a coöperating latch pawl 23 (Fig. 16). Springs 24 hold the pawls in engagement with the hammers. Bars 25 are pivoted to the pawls 23, respectively, each bar resting upon the front end of the lever 26. When the type-carriers move forwardly the front ends of the levers 26 are raised by shoulders 27 on the type-carriers, thereby lifting the ends of the corresponding bars 25 so that they will be engaged by a bar 28 carried by arms attached to the rock shaft 21. The shaft 21 is rocked by a link 29 at each forward movement of the type-carriers; the hammers 20 corresponding to the type-carriers so operated are released by coöperation of the levers 26, the bars 25 raised thereby, and the bar 28 which engages and presses forwardly the bars 25 so raised; thereby disengaging the proper pawls 23 and permitting the hammers to drive the type to print.

It will be understood that the type on the type-carriers are arranged in sequential order from "0" at the end to "9" farthest from the end of each carrier; and that the shoulders 27 of the type-carriers do not engage nor operate the levers 26 until the type-carriers move beyond the position to permit "0". Therefore, when it is desired to print any number including one or more "0" characters in the lower orders it is necessary to provide couplings whereby the bars 25 in higher orders will raise the bars 25 in lower orders so that the bar 28 will release the hammers whose operation is necessary to permit the "0" characters in the lower orders. The machine of the United States patents aforesaid has such couplings in the form of a tongue or projection 30 on each bar 25 above units order, (Figs. 16 and 17) the said tongues extending under the bars in the lower orders, respectively, so that, for instance, when the bar 25 in thousands order is raised, the said bar will raise the bar in hundreds order, and the bar in hundreds order will raise the bar in tens order, and so on. The machines of said patents do not include any means for separating or "splitting" this train of couplings, and novel devices for such purposes constitute a part of the subject-matter of this application and will be described hereinafter. The said machines also contain adding mechanism 31, which is operated automatically to add the numbers recorded, but it is not necessary to describe herein the operation of said adding mechanism. It appears useful only to mention that during the listing and adding of numbers, the adding mechanism is automatically disconnected from the racks on forward movement of the latter and is automatically entrained with and operated by said racks on backward movement of the latter. When it is desired to list the total contained in said adding mechanism said mechanism may be held in connection with the racks 7 during forward movement of said racks, which operation will cause the total to be printed and the adding-mechanism "cleared" if desired,—this being known as the "clearing" operation.

The foregoing is a description of the structure of the prior or known machines with which my invention is combined and into which it is embodied as a coöperating part of a complete and improved machine having a broader scope and range of useful functions and operations than are inherent in said known machines.

To attain the objects of my invention I have embodied in the machine the novel mechanism which I will now describe.

In the machine illustrated there are eighteen type-carriers 9, and a like number of racks 7 and, therefore, an equal number of adding wheels in the adding mechanism. Any number up to and including the eighteenth order may be set up in the pin carriage, recorded by operation of the racks 7 and the type-carriers 9 and the hammers 20, and added by coöperation of the adding mechanism 30 with the racks 7. I provide means for separating or "splitting" the machine into separate sections or columns, so that two or more parallel columns of numbers may be simultaneously added, or added and recorded. A part of this novel equipment is coöperatively related to the type-driving hammers and their release devices so that the couplings between the hammer release devices may be separated or split at any desired point, thus enabling the machine to record numbers in two or more parallel columns at one operation, without printing the "0" characters in the orders between said columns. In the embodiment shown each trip bar 25, from and including the one in the fourth (or thousands) numerical order to and including the one next to that one in the highest order, has two pins or rivets 32 (Figs. 16 and 17) supporting a sliding coupling plate 33 which is actuated forwardly by a spring 34. The pins or rivets 32 have heads to hold said plates 33 thereon. The tongues 30 on the trip-bars 25 in higher orders extend under the coupling plates 33 in lower orders, respectively, thereby, enabling said trip-bars in the higher orders to raise the ones in lower orders when the occasion exists for printing "0's" in lower orders. Each coupling plate 33 has a notch 35 (Fig. 16) in its lower edge. When any coupling plate is moved rearwardly the notch 35 makes room wherein the tongue 30 of the adjacent trip-bar 25 may move without raising any other trip-bar, thereby preventing operation of the hammers which would print "0", thus, "splitting" or separating the recording mechanism into separate groups or columns capable of operation to record numbers in parallel columns simultaneously. A bail 36 (Figs. 15 and 16) is pivotally supported and extends transversely under the coupling plates, being sustained by a spring 37. Each coupling plate has a shoulder 38 arranged to slide over and latch behind the bail 36 when said coupling is moved rearwardly. As many couplings may thus be latched as the circumstances may require, and the operation of one coupling will not release any other previously latched because of the fact that the forward slot $33^a$ in each coupling is considerably wider than the shank of the rivet or pin 32 extending therethrough; thus permitting the frictional engagement of the coupling and the latch bar 36 to draw downwardly those couplings which are latched, while any couplings moving over the latch-bar will be pressed upwardly as far as permitted by the slot $33^a$. The couplings extend through slots in a plate 39 and are provided with finger pieces or keys 40 on their outer ends whereby they may be conveniently manipulated. A release device for any or all of the couplings consists of a sliding plate 41, of similar shape and arrangement and operation to the couplings, except that said plate 41 has a cam shoulder 42, longer and wider than the shoulders 38, and operating to move the bail 36 a distance great enough to release all the couplings 33 without itself becoming latched. Specimens of some of the work performed on the machine are shown in Figs. 22 to 28 inclusive, and these will be referred to hereinafter.

When it is desired to print the total in any of the columns it is necessary to move a part of the stop or detaining plate 19 to permit the necessary racks and type-carriers to operate and print the total. A total key 43 is pivoted to a lever 44, (Fig. 1) whose rear end is pivoted to a bell-crank lever 45 having a link 46 connected thereto. The rear end of the link 46 is pivoted to the lower end of an arm 47 attached to and extending above a rock-shaft 48. An arm 49 (Fig. 14) and the upwardly extending part of the arm 47 support a shaft 50 on which are four disks indicated by 51, 52, 53 and 54, respectively. On these four disks are four alined pins 55. A rod 56 between the shaft 50 and the carriage 1 supports four levers 57 whose forward ends extend into holes or notches in the four divisions of the plate 19, so that depressing the four ends of said levers will also depress the parts or divisions or sections of the plate 19. For convenience in referring thereto (Fig. 6) I have designated the sections of the plate 19 by A, B, C and D, respectively. The section A serves as a stop for the six trains of recording elements in the six lower orders; the section B serves as a stop for the next three trains of recording elements; the section C serves as a stop for the next three trains of recording elements; and the section D serves as a stop for the six trains of recording elements in the six higher orders within the capacity of the eighteen-order machine shown. By depressing the total key 43 the link 46 will be forced rearwardly and will rock the shaft 48 which will swing the shaft 50 forwardly from the position shown in Fig. 4 to the position shown in Fig. 5. Assuming that the pins 55 are in front of the shaft 50 during the forward movement of the latter, said pins will be pressed against the ends of the levers 57 and will operate said levers effectively to move downwardly all of the sections A, B, C and D of the plate 19, from the position in front of the rack heels shown in Fig. 4 to the position out of the path of said heels in Fig. 5. This permits the racks and type-carriers to move forwardly effectively to print any total or sub-total contained in the adding mechanism. By adjusting the split keys or couplings 33 the machine may be operated to record a single column of figures and the total thereof, as shown in Fig. 22, or two parallel columns of numbers and the totals thereof, as shown in Fig. 23, or three parallel columns of numbers and the totals thereof, as shown in Fig. 24, all parts of the plate 19 being released in printing the various totals and performing the "clearing" operations shown in said Figs. 22, 23 and 24. Retractile springs 58 restore and yieldingly hold the sections A, B, C and D of the plate 19 to idle position after each operation.

Mechanism is provided whereby the total in any one or more columns may be printed and "cleared" from the machine without printing or clearing the total in any of the remaining columns. This is effected by manipulative means whereby any selected parts or sections of the plate 19 may be released without releasing the other parts or sections of said plates. For instance, the disk 51 has a pin 59 which may be positioned to operate the lever 57 which releases the section A of the plate 19; the section A releasing six recording and adding trains. The disks 52, 53 and 54 have no pins which correspond with the pin 59, so that the sections B, C and D of the plate 19 will not be operated. The manipulative means for positioning the pin 59 comprises a lever 60 at the front of the machine, having a link 61 leading to a pivoted rack 62 at the rear of the machine (Figs. 2 and 14), said rack meshing with a pinion 63 on the shaft 50. Operation of the lever 60 will rotate the shaft 50 to any of its adjustments. The lever 60, in the embodiment shown, is capable of operation and adjustment into six different adjustments, so that the adding mechanism can be controlled to coöperate with the recording mechanism performing the examples illustrated. The lever 60 has a pin or projection arranged to engage in any one of the six holes in the plate 64, and thereby latch said lever and the shaft 50 in any of the six adjustments. In the rear position shown in Figs. 1 and 2 the lever holds the pins 55 in position to release all of the sections A, B, C and D; in another position or adjustment the lever 60 holds the pin 59 in position to engage and operate the lever 57 and release the section A controlling the six recording and adding trains in the six lower orders.

The disks 52 and 53 have two alined pins 65 (Fig. 14) and in another adjustment of the lever 60 said pins will be positioned to release the sections B and C, which control the second column or group of six trains of adding and recording devices. The sections A and D will not be released when this operation is effected, so that the second column of six orders may be cleared without disturbing the other columns.

The disk 54 has a pin 66 (Fig. 14) which, in a fourth adjustment of the lever 60, will be positioned to release the section D which controls the third column or groups of six trains of adding and recording devices. The sections A, B and C will not be released when this operation is effected, so that the third column of six orders may be cleared without disturbing the other columns.

The disks 51 and 52 have two alined pins 67 (Fig. 3) which, in a fifth adjustment of the lever 60, will be positioned to release the sections A and B which control a group or column of nine trains of adding and recording devices in the lower orders. The sections C and D will not be released when this operation is effected, so that the first column of nine orders may be cleared without disturbing the other column.

The disks 53 and 54 have two alined pins 68 (Fig. 18) which, in a sixth adjustment of the lever 60, will be positioned to release the sections C and D which control a group or column of nine trains of adding and recording trains in the higher orders. The sections A and B will not be released when this operation is effected, so that the second column of nine orders may be cleared without disturbing the other columns.

From the foregoing it is plain that the machine may be used as a complete adding and recording machine, the adding and recording elements from units to the highest order being coöperatively related, so that any numbers and the total thereof may be recorded. An example of such work is shown in Fig. 22. The example of Fig. 23 is produced by dividing or "splitting" the machine into two sections or columns, each of which has a capacity of listing and adding nine orders, if desired. Fig. 24 shows three parallel columns of items listed and added, and the three totals printed at one operation; two of the totals being subsequently transferred to and added in the third column.

As stated in the statement of the object and nature of the invention, the machine embodies a transfer carriage containing mechanism settable incidentally to the clearing operation to represent the total. In that embodiment of my invention, which is illustrated in the accompanying drawings, the mechanism which is set to represent the total cleared is controlled or set by the operation of the recording mechanism. The invention, however, is not restricted to operation by the recording mechanism and, except in such claims where the combination is specifically restricted, any means or method for operating or setting the mechanism to represent the total cleared will be embraced within the scope and ambit of the invention and covered by the claims not specifically restricted.

A shaft 69 (Figs. 3, 7 and 8) is slidably supported in the supporting frames 70. A handle or lever 71 is attached to the shaft 69 and an expansion spring 72 encircles said shaft 69 between the handle 71 and the adjacent frame 70. The tendency of the said spring is to hold the shaft 69 and the other parts carried thereby and constituting the transfer carriage at the extreme left relative to the operator facing the front of the machine, as shown in Fig. 3. Upon the shaft 69 between the supporting frames 70 two side members 73 are attached, said members constituting the sides of the transfer carriage and supporting a shaft 74 below the shaft 69, and also supporting another shaft 75. Upon the shaft 74, between the carriage side members 73, a number of plates 76 are pivotally supported, said plates being spaced uniformly with the type-carriers 9 and the racks 7 with which said plates coöperate when said type-carriers and racks are operated to record totals. The plates 76 have arcuate slots 77 through which the shaft 69 extends, said shaft 69 constituting a stop or abutment to determine the scope and movement of said plates 76. A spring 78 connects each of the plates 76 with a small rod 79 held by the parts 73. In the upper edge of each plate 76 ten notches 80 are formed, said notches corresponding to the ten figures or digits. A latch plate 81 is pivoted upon the shaft 75 and has a locking edge 82 arranged to engage in the notches 80 and thereby hold or lock the plates 76 in any adjustment in which they may be set by operation of the recording mechanism in the clearing and recording operations or otherwise. A spring 83 connecting the plate 81 with one of the members 73 serves to actuate the locking edge 82 of the plate 81 into engagement with the plates 76. Each of the plates 76 has a forwardly extending arm 84 (Figs. 1 and 10) which, in certain adjustments, are engaged by extensions 9ª on the type-carriers 9. The locking plate 81 being disengaged from the plates 76, in the manner shown in Fig. 9, the said plates 76 so engaged by the extensions 9ª will be moved or set by the operation of the type-carriers to represent the numbers recorded. It will be understood that, as hereinafter explained, the locking plate 81 is released to permit such operation, and is also operated into engagement with the plates 76 to hold them in position to which they are moved or set by the type-carriers. The shaft 69 and the parts carried thereby, including the frame parts 73 and the plates 76 and the other coöperating parts, constitute a carriage, which is laterally movable and in which the numbers or totals recorded may be set up by setting the plates 76 through operation of the type-carriers 9. This carriage is laterally-movable by the handle or lever 71 as shown in Fig. 7 in position for receiving a total to be recorded by six type-carriers in the right hand column or space relative to the operator facing the machine. The carriage may then be adjusted so that the total or number set up or represented therein may be recorded as an item or as a sub-total in another column and may also be added in the other column to which it is transferred. The mechanism coöperating with this carriage which, for convenience, may be called a transfer carriage or a carriage for transferring numbers, will now be described.

A plate 85 (Figs. 7 and 8) is attached to one of the frames 70 and has an elongated slot through which the handle or lever extends. In the rear edge or wall of the slot are formed four notches designated by the numerals 86, 87, 88 and 89, respectively. When the transfer carriage is positioned at the right relative to the operator facing the machine, as shown in Fig. 7, in which position the carriage coöperates with six type-carriers, the lever or handle 71 is engaged and latched within the notch 86. To render the carriage coöperative with nine type-carriers at the right relative to the operator the lever 71 will be engaged and latched within the second notch which is designated by 87. To render the carriage coöperative with the middle or central six type-carriers the lever or handle 71 will be engaged and latched in the notch 88. To render the carriage coöperative with the required number of type-carriers to record any number set up or represented within the carriage the lever or handle 71 will be engaged and latched within the notch 89.

A sliding plate 90 is supported below the plate 85 and has a slot corresponding to the slot in said plate 85. The plate 90 is a latch device for holding the lever or handle 71 within any of the notches in the plate 85 and is operable to release said lever or handle from said notches, as will hereinafter appear. A rock-shaft 91 is supported by one of the frames 70 and by a depending portion of the plate 85. Two arms 92 are attached to the rock-shaft 91 and are pivotally connected to the plate 90 so that the movement of said arms controls said plate 90. A spring 93 (Figs. 7, 8 and 11) connects one of said arms with a stationary part, thereby actuating the plate 90 so as to register the slot therein with the slot in the plate 85 and hold the arm or lever 71 in its normal or idle position disengaged from the notches in said plate 85.

One of the arms 92 has an extension 94 resting upon a cam 95. In the position shown in Fig. 12 the cam 95 is effective to hold the plate 90 in its rearward position in which said plate 90 holds the arm or lever 71 within the notches in the plate 85. If the cam 95 be turned so as to bring the flat side or surface thereof into contact with the extension 94 the said extension 94 will be permitted to drop, thereby permitting the spring 93 to move the plate 90 forwardly so as to disengage or unlatch the handle or lever 71 from the notches in the plate 85. The cam 95 is rigid with one end of a rock-shaft 96 supported by one of the frames 70, the opposite end of said rock-shaft 96 carrying a lever 97. The spring 98 (Figs. 8 and 11) encircling the shaft 96 between the lever 97 and the adjacent frame 70 actuates the parts so as to hold the cam 95 in the position shown in Fig. 12, an abutment pin 97ª holding the lever 97 from further forward movement. A plate 99 is pivoted upon a shaft 100. The front end of the plate 99 has a pin-and-slot connection 101 with a lever 102. The lever 102 has a projection 103 extending into a peculiarly shaped slot 104 in the adjacent arm 10 so that whenever the arms 10 are moved forwardly in recording and clearing operations, as previously described, the lever 102 will be operated to swing the upper part of the plate forwardly (see Fig. 11). A latch release pawl 105 is pivoted upon the plate 99 and has shoulders upon its upper edge adjacent to the lower end of the lever 97. When the arms 10 are swung forwardly, as they do every time any item is added or listed, the lever 102 (Figs. 1 and 11) is operated and the plate 99 is oscillated. This operation carries the latch-release pawl 105 forwardly, causing one of the shoulders on said pawl to engage against the front side of the lever 97, so that backward movement of the pawl 105 will turn the cam 95 and permit the arms 92 to be actuated forwardly by their spring 93, thereby releasing the lever 71 from any one of the notches 86, 87, 88 or 89 in which said lever may be latched.

In order to set up in the transfer carriage any number or total, the lever or handle 71 is manipulated to set the carriage in the proper position. The handle or lever 71 will be held in the notch 86, 87 or 88 in which it may be latched. This adjustment of the handle or lever 71 and the plates 76 raises the extensions 84 on said plates 76 to the position shown in Fig. 10 so that the tails 9ª of the type-carriers which may be operated in recording the total will engage said extensions 84 and set the plates 76 to represent the total recorded. While the handle or lever 71 is in any one of the notches 86, 87 or 88 the latch 81—82 is held out of engagement with the plates 76 to permit operation of said plates 76 by the type-carriers 9. Said latch 81—82 has a tail 81ª which is arranged to engage against an abutment 106 when the transfer carriage 96 is in position to receive any number, that is, when the lever or handle 71 is latched in either of the three notches 86, 87 or 88, but not when the said lever or handle 71 is latched in the notch 89. After the total is printed and set up on the plate 76, the lever or handle 13 being then released to permit the printing mechanism to return to idle position, the plates 76 become latched to hold represented or set up that total which had been printed. This is effected by a sudden and rapid backward movement of the pawl 105 which releases the cam 95 and permits the spring 93 to throw the lever or handle 71 out of the notch 86, 87, or 88. This movement of the handle or lever 71 oscillates the carriage and plates 76, swinging the lower part thereof rearwardly and permitting the latch 81—82 immediately to engage in the notches 80 in the plates 76, thereby holding the said plates set to represent the total printed. The spring 72 expands as soon as the lever or handle 71 is released from the notch 86, 87 or 88, and quickly moves the transfer carriage to its home or normal position, the total which was recorded being still retained or set up in the transfer carriage.

From the foregoing it will be understood that there is a direct and intimate coöperation between the clearing and total printing mechanism on the one hand, and the transfer carriage which contains the plates 76, on the other hand. This coöperation enables the operator of the machine to transfer or set up in the transfer carriage any total contained in the first or lower or right hand column of six orders, by adjusting the transfer carriage so that the handle or lever 71 is latched in the notch 86. By latching the handle or lever 71 in the notch 86 the six plates 76 at the left of the transfer carriage are positioned for operation by the type-carriers in the first or right hand column of six orders. Then, when the transfer carriage returns to its home or normal position, the plates 76 which had been set to represent the total in the right hand column of six orders are ready for coöperation with the type-carriers in the left hand column of six orders. By latching the handle or lever 71 in the notch 87 the nine plates 76 at the left of the transfer carriage are positioned for operation by the type-carriers in the first or right hand column of nine orders. Then, when the transfer carriage returns to its home or normal position, the plates 76 which had been set to represent the total in the right hand column of nine orders are ready for coöperation with the type-carriers in the left hand column of nine orders. By latching the handle or lever 71 in the third notch 88 the six plates 76 at the left of the transfer carriage are positioned for operation by the type-carriers in the second or central column of six orders. Then, when the transfer carriage returns to its home or normal position, the plates 76 which had been set to represent the total in the second or central column of six orders are ready for coöperation with the type-carriers in the left hand column of six orders. Or, if the lever 60 be set in position to entrain a series of twelve type-carriers, so that there is a total of twelve orders to be transferred from the right to the left, this will be effected also by latching the lever or handle 71 in the notch 88 so as to position the entire series of twelve plates 76 for operation by the twelve type-carriers at the right. Also by this adjustment of the transfer carriage a total may be transferred or set up therein from the lower or right hand column of six orders, to be subsequently added into the second column of six orders.

When the transfer carriage is in its home or normal position any total or number contained or set up in said carriage may be recorded in the column to which it has been transferred, and also added in said column. The handle or lever 71 must first be latched in the notch 89 which holds the arms 84 of the plates 76 in position to be engaged by the tails 9ª of the type-carriers when the latter move. In order to enable the type-carriers to be operated to record and add the number or total set up or represented by the plates 76 provision is made to operate the plates 19 so as to release all of the type-carriers except the six in lower orders as an incident to the latching of the handle or lever 71 in the notch 89. One of the carriage side-members 73 has an extension 107 (Figs. 8 and 9). A lever 108 (Figs. 2, 11 and 13) is pivoted upon the shaft 100, and has two arms, one of said arms being engaged by the extension 107 when the latter is moved forwardly by the operation of engaging the lever 71 in the notch 89. A depending link 109 has pin-and-slot connection (Fig. 11) with the other arm of the lever 108, and said lever is actuated downwardly by a spring 110 connecting said lever and said link, another spring 111 actuating the link 109 downwardly. The link 109 is raised when the lever 108 is engaged and moved by the extension 107 of the transfer carriage when the said transfer carriage is adjusted to enable the operator to print and add the number represented or set up therein. The lower end of the link 109 has a shoulder 112 (Fig. 11) which is under a lever 113 on the rod or shaft 56 which carries the levers 57, so that said rod or shaft 56 will be rocked when the link 109 is raised. Because of well-known pin-and-notch connection 114 (Figs. 4 and 5) the levers 57 may be operated independently by the disks 51, 52, 53 and 54, as previously described. But when the shaft or rod 56 is rocked by the link 109 three of the levers 57 will be operated so as to depress the sections B, C and D of the plate 19. Then when the type-carriers 9 are operated by operation of the handle 13 or otherwise, the type-carriers 9 will travel forwardly (except the six in the lower right hand column which are not released until stopped by the tails 9ª of the type-carriers engaging and abutting against the extensions 84 of the plates 76. Thus the number or total set up or represented in the transfer carriage, of which carriage the plates 76 are a part, may be printed and added in other columns. The lever 71 will be released from the notch 89 after each operation of the type-carriers, in the same manner that it is released from the notches 86, 87 and 88, and when the said lever 71 is so released from the notch 89 the link 109 will be lowered and the parts B, C and D of the plate 19 will return to their normal position. Should the number or total transferred contain more than nine orders, and if it is desirable to eliminate or throw out the decimals below the lowest of nine orders, this may be accomplished. To do so, set the lever or handle 71 in the notch 88 and clear the adding mechanism, which sets the twelve plates of the transfer carriage to represent the total cleared, including the three excess decimals. Then set the lever or handle 71 in the notch 89 and operate the adding mechanism. Then set the lever 60 to render operative the left hand column of nine orders, and operate the total printing and clearing mechanism to record the total in the left hand column of nine orders. This eliminates or throws out the useless decimals. When the transfer carriage is positioned to take in a representation of another total said carriage will be cleared. This is effected by the release of the latch 81—82 at the time the tail part 81ª engages the abutment 106. The springs 78 restore all plates 76 to idle position when the latch 81—82 is released, thereby clearing the transfer carriage to receive another number to be transferred to another column.

The principles and essential attributes of my invention will be readily understood from the foregoing description. I do not restrict myself to specific features or methods of combination, since many variations and modifications of the invention are obvious.

What I claim and desire to secure by Letters Patent is:—

1. In an adding machine, the combination with a series of adding wheels arranged in numerical orders, and mechanism for operating said adding wheels as a series or in groups at the will of the operator, of mechanism for clearing selected groups of said adding wheels independently of any other groups, mechanism settable incidentally to the clearing operation of one of said groups of wheels to represent the total or number cleared, means for adjusting said settable mechanism in coöperative relation with another group of adding wheels, and means for operating said coöperative group of adding wheels to add the total or number represented by said settable mechanism.

2. In an adding machine, the combination with a series of adding wheels, arranged in numerical orders, and mechanism for operating said adding wheels as a series or in groups at the will of the operator, of mechanism for clearing one of said groups of adding wheels independently of any other group in the series of wheels, mechanism settable incidentally to the clearing operation of said group of wheels to represent the number cleared, and means for causing coöperation of said settable mechanism and the adding wheels of another group whereby said adding wheels will add the number represented by said settable mechanism.

3. In an adding machine, the combination with a series of adding wheels arranged in numerical orders, mechanism for operating said wheels in separate groups to add separate series or lists of numbers and retain separate totals of the different series or lists of numbers at the same time, of mechanism adjustable to represent the total of one of said series or lists of numbers, means for moving said adjustable mechanism to position to coöperate with another group of wheels, containing another total in said series of wheels, and mechanism for coöperating said last-named group of wheels with said mechanism to add to said other total that total which is represented by said adjustable mechanism.

4. In an adding machine, the combination with recording and adding and clearing mechanisms, and means for operating said mechanisms in recording and adding and clearing operations, of a paper carriage shiftable to present different columns of paper to the recording mechanism, mechanical elements supported independently of said paper carriage settable incidentally to the clearing operation to represent the number cleared, additional mechanism for adding the number represented by said elements, and devices for moving said elements from position to coöperate with said first-named adding mechanism to position to coöperate with said additional mechanism.

5. In an adding machine, the combination with recording mechanism, a paper carriage for feeding paper to said recording mechanism, adding and clearing mechanisms, and means for operating said mechanism in recording, adding and clearing operations, of mechanical elements settable incidentally to the clearing operation to represent the number cleared, a shiftable support for said elements independent of said paper carriage, additional mechanism for adding the number represented by said elements, and devices for moving said elements from position to coöperate with said first-named adding mechanism to position to coöperate with said additional mechanism.

6. In an adding machine, the combination with recording mechanism including a paper carriage, adding and clearing mechanisms, and means for operating said mechanisms in recording, adding and clearing operations, of mechanical elements independent of said paper carriage settable incidentally to certain recording operations to represent the number recorded, additional mechanism for adding the number represented by said elements, and means for moving said elements from position to coöperate with said first-named adding mechanism to position to coöperate with said last-named mechanism.

7. In an adding machine, the combination with a platen arranged to hold paper, and mechanism operable to record two or more parallel columns of numbers, while said platen remains stationary as to lateral movement, of mechanical elements settable incidentally to the recording of a number in one of said columns to represent the number recorded, and means for producing a coöperation between said elements and the recording mechanism of another column to record in said other column the number represented by said elements.

8. In an adding machine, the combination with a shiftable paper carriage, and mechanism operable to record a number of columns of items on paper in said carriage, of a transfer carriage separate from said paper carriage receiving the number recorded in one column, and means for coöperating the recording mechanism of another column with said transfer carriage to record in said other column the item in said transfer carriage.

9. In an adding machine, the combination with adding mechanism, and recording mechanism provided with a paper carriage, of a carriage operable independently of said paper carriage, means for operating said adding mechanism and as an incident to such operation setting up in said last-named carriage the number represented in said adding mechanism, additional adding mechanism, means for moving said carriage from the position in which numbers are set up therein by said first-named adding mechanism to position to coöperate with said last-named adding mechanism, and means for operating said last-named adding mechanism to add the numbers set up in said carriage.

10. In an adding machine, the combination with adding mechanism operable to add series of numbers, a paper carriage, means for supporting the paper carriage in a stationary position to receive records in different column spaces, and mechanism coöperating with the adding mechanism for recording on paper in said carriage totals of the numbers added, of mechanical elements set by the recording mechanism incidentally to the operation thereof in recording a total to represent the total recorded, and additional recording mechanism coöperating with said elements for recording in any column on the paper in said carriage the total represented by said elements.

11. In an adding machine, the combination with adding and clearing mechanisms, and means for operating said adding and clearing mechanisms, of elements set as an incident to certain operations of said adding mechanism to represent the number contained in said adding mechanism, separately operable adding mechanism, devices for holding said elements in coöperative relation with said separately operable adding mechanism, means for operating said first-named adding mechanism to add the number represented by said elements, and means for releasing said holding devices when said last-named adding mechanism operates.

12. In an adding machine, a series of groups of actuators, adding mechanism under control of said actuators, means for operating the actuators and the adding mechanism in adding operations, a device for rendering said adding mechanism operative for clearing operations, elements for preventing operation of said groups of actuators, respectively, a carriage for moving said elements in one direction to release said actuators successively, and a manipulative device for moving said elements selectively in one direction to enable one or another group of actuators to be operated as desired.

13. In an adding machine, a series of type-carriers and a series of adding wheels arranged to coöperate to add numbers containing as many orders as there are wheels, means for operating said adding wheels in groups to produce one or more totals at the same time, and a transfer carriage containing elements set incidentally to the operation of one of said groups of adding wheels to represent the total in said groups of adding wheels.

14. In an adding machine, adding wheels operable in adding operations, actuators for operating said adding wheels in adding operations, a number of detaining devices for preventing movement of said actuators, means for moving said detaining devices in one direction to release said actuators successively, and means for moving selected ones of said detaining devices in another direction for releasing said actuators.

15. In an adding machine, adding wheels operable in adding and clearing operations, actuators for operating said adding wheels in adding and clearing operations, detaining devices for preventing movement of said actuators, means for moving said detaining devices in one direction to release said actuators successively for adding operations, and means for moving certain of said detaining devices in another direction to release certain of said actuators for adding operations.

16. In an adding machine, adding wheels operable in adding and clearing operations, actuators for operating said adding wheels in adding and clearing operations, detaining devices for preventing operation of said actuators, means for moving said detaining devices in one direction to release any desired number of said actuators for adding operations, means for moving certain of said detaining devices in another direction to release certain of said actuators for adding operations, and additional means for moving all of said detaining devices to release all of said actuators for clearing operations.

17. In an adding machine, a series of adding wheels, operable in adding and clearing operations, a series of actuators for operating said adding wheels in adding and clearing operations, detaining devices normally in position to prevent movement of said actuators, means for moving said detaining devices in one direction to release a selected number of said actuators for adding operations, means for moving certain of said detaining devices in another direction to release less than all of said actuators for clearing operations, means for moving certain of said detaining devices in said last-named direction to release certain of said actuators for adding operations, and means for effecting release of all of said actuators for clearing all of said adding wheels.

18. In an adding machine, the combination with adding and clearing mechanism, of type for printing the numbers added and the totals thereof, hammers for driving said type to print, couplings whereby operation of hammers in higher orders causes operation of hammers in lower orders, a manipulative element for disabling one of said couplings, a movable latch bail for holding said elements in position to disable said couplings, and an additional manipulative element for effecting release of said disabling element and said latch bail.

19. In an adding machine, the combination with type-driving hammers, means for operating said hammers, and couplings whereby operation of hammers in higher orders incidentally results in operation of hammers in lower orders, of keys whereby said couplings may be disabled, a releasable latch bail for holding said keys in disabling position, and a manipulative device for effecting disengagement of said bail and keys.

20. In an adding machine, the combination with type-driving hammers, means for operating said hammers, and couplings whereby operation of hammers in higher orders incidentally results in operation of hammers in lower orders, of keys whereby said couplings may be disabled, means for holding said keys in disabling position, and additional manipulative means for releasing said keys.

21. In an adding machine, the combination with type-driving hammers, means for operating said hammers, and couplings whereby operation of hammers in higher orders incidentally results in operation of hammers in lower orders, of keys whereby said couplings may be disabled, means for holding said keys in disabling position, additional manipulative means for releasing said keys, and means for restoring said couplings to operative adjustment when said keys are released.

22. In an adding machine, the combination with type-driving hammers, means for operating said hammers, and couplings whereby operation of hammers in higher orders incidentally results in operation of hammers in lower orders, of keys whereby said couplings may be disabled, means for holding said keys in disabling position, additional manipulative means for releasing said keys, and means for restoring said keys to idle position after they are released.

23. In an adding machine, the combination with type-driving hammers, means for operating said hammers, and couplings whereby operation of hammers in higher orders incidentally results in operation of hammers in lower orders, of keys whereby said couplings may be disabled, means for holding said keys in disabling position, additional manipulative means for releasing said keys, and means for restoring said keys and couplings to operative adjustment after being released.

24. The combination with independently operable adding mechanisms, and means for operating said mechanisms to add two columns of numbers simultaneously, of recording mechanism for printing the separate totals in said columns concurrently or at different times as desired, mechanical elements settable as an incident to the printing of the total in one of said columns, means for moving said mechanical elements to position to coöperate with the recording mechanism in another column, and means for coöperating said last-named recording mechanism with its corresponding adding mechanism to add the numbers represented by said elements.

25. The combination with mechanism operable to add two columns of numbers simultaneously, of mechanism for printing said numbers in parallel columns simultaneously, of mechanism for printing said numbers in parallel columns simultaneously, means for operating adding mechanism of one of said columns and corresponding parts of the printing mechanism to print the total represented in said last-named adding mechanism, mechanical elements settable as an incident to said total printing to represent said total, automatic means for moving said mechanical elements to coöperate with the adding mechanism of another column, and means for coöperating the last-named adding mechanism and the corresponding parts of the printing mechanism with said mechanical elements effectively to introduce in said adding mechanism a number represented by said elements.

26. The combination with adding mechanism, recording mechanism, means for operating said recording and adding mechanisms to record and add numbers, and means for operating said mechanisms to record the total of the numbers added, of mechanical elements set as an incident to said operation of recording the total to represent said total, automatic means for moving said mechanical elements from one column space to another, and additional mechanism for adding said total to other numbers.

27. The combination with adding mechanism, recording mechanism, means for operating said two mechanisms to record and add numbers, means for operating said two mechanisms to record the total of the numbers added, a paper carriage arranged to feed paper to said recording mechanism, mechanical elements set as an incident to said last-named operation to represent the total recorded, a support for said elements separate from said carriage, and additional mechanism for recording and adding the total represented by said elements.

28. The combination with recording mechanism, a paper carriage arranged to feed paper to said mechanism, adding mechanism, means for operating said two mechanisms to record and add numbers, a carriage separate from said paper carriage, means for operating said two mechanisms to set up or represent in said last-named carriage the total contained in said adding mechanism, and additional means for recording the numbers set up or represented in said last-named carriage.

29. The combination with recording mechanism, a paper carriage for feeding paper to said mechanism, adding mechanism, means for operating said two mechanisms, to record and add numbers, means for operating said two mechanisms to clear said adding mechanisms and record the total, a carriage separate from said paper carriage, elements in said separate carriage settable to represent the total as an incident to the clearing operation, and additional mechanism arranged to coöperate with said separate carriage to record and add the total represented in said carriage, substantially as specified.

30. In an adding machine, a series of type-carriers arranged in numerical orders, means for operating said type-carriers as a series or in groups at the will of the operator, mechanical elements operated by said type-carriers to represent the number recorded, and means for operating the other group of type-carriers in connection with said mechanical elements to record said number, substantially as specified.

31. In an adding machine, the combination with adding mechanism, recording mechanism, and a paper carriage for said recording mechanism, of a carriage separate from said paper carriage, means for operating said adding mechanism and as an incident to such operation setting up in said separate carriage the number represented in said adding mechanism, and additional means for clearing from said separate carriage the number so set up.

32. In an adding machine, the combination with adding mechanism, recording mechanism, and a paper carriage serving said recording mechanism, of a carriage separate from said paper carriage, means for operating said adding mechanism and as an incident to such operation setting up in said separate carriage the number represented in said adding mechanism, and additional recording mechanism operable to record the number set up in said separate carriage.

33. In an adding machine, the combination with adding mechanism, of a carriage, actuators for operating said adding mechanism and as an incident to such operation setting up in said carriage the number represented in said adding mechansm, a paper carriage movable independently of said first named carriage, and recording mechanism operable independently of the aforesaid actuators to record on paper in said paper carriage the number set up in said first-named carriage and to clear said carriage.

34. In an adding machine, the combination with adding mechanism, of a carrige, means for operating said adding mechanism and as an incident to such operation setting up in said carriage the number represented in said adding mechanism, mechanism operable to record the numbers set up in said carriage, a paper carriage movable independently of said first-named carriage serving paper to said recording mechanism, and means for adding the numbers so recorded as an incident to the recording thereof.

35. In an adding machine, the combination with adding mechanism, of a carriage, mechanism for articulating said adding mechanism and said carriage and setting up in said carriage the number represented in said adding mechanism, recording mechanism operable independently of or jointly with the aforesaid mechanisms as desired, a separate paper carriage for feeding paper to said recording mechanism, means for operating said recording mechanism to record the numbers set up in said first-named carriage, and additional mechanism for adding the numbers as an incident to the recording thereof as aforesaid.

36. In an adding machine, a series of adding wheels, recording mechanism controlling said adding wheels, means for operating said recording mechanism to record lists of items and to operate said adding wheels effectively to add the items as an incident to the listing thereof, a paper carriage for serving paper to said recording mechanism, an additional carriage, elements in said additional carriage settable to represent numbers, mechanism for causing said recording mechanism to record the total represented in said adding wheels and to set said elements in said carriage to represent the total recorded, an additional series of adding wheels, and means for operating said additional series of adding wheels to represent therein the numbers or totals represented by said elements in said carriage.

37. In an adding machine, the combination with adding mechanism, recording mechanism, and a paper carriage, of a carriage supported separately from said paper carriage, mechanical elements in said separate carriage adapted to be set up to represent numbers, means for operating said adding mechanism and as an incident to such operation setting said mechanical elements to represent the number represented in said adding mechanism, and additional adding mechanism operable under control of said recording mechanism to add the numbers represented in said carriage.

38. In an adding machine, the combination with adding mechanism, of a carriage, mechanical elements in said carriage adapted to be set up to represent numbers, means for operating said adding mechanism and as an incident to such operation setting said mechanical elements to represent the number represented in said adding mechanism, a latch device for holding said mechanical elements, and means for restoring said mechanical elements to idle position while said latch device is released.

39. In an adding machine, the combination with adding mechanism and differential mechanism settable to represent numbers, of a carriage, mechanical elements in said carriage adapted to be set to represent numbers, means controlled by said differential mechanism for operating said adding mechanism and as an incident to such operation setting said mechanical elements to represent the number represented in said adding mechanism, a releasable device for holding said elements in their set positions, a laterally movable paper carriage movable independently of the first-named carriage, and mechanism for recording on paper in said paper carriage a number represented by said elements.

40. In an adding machine, the combination of an accumulator, reciprocating actuators for the respective members thereof, primary differential stops for determining the extent of reciprocating movement of said actuators, keys for setting said primary stops to represent any desired number; secondary stops settable in line with the actuators respectively, means for locking said secondary stops after one or more thereof have been moved by the actuators; and a laterally shiftable support for said secondary stops.

41. In a machine of the character described, the combination of an accumulator, actuators for the respective members thereof, primary differential stops for limiting movement of said actuators, keys for positioning the primary stops to represent any desired number, secondary stops set by the actuators to represent the same number as that represented by the primary stops, means for locking and unlocking said secondary stops, a laterally shiftable support for the latter, and means for causing said secondary stops to limit movement of said actuators after said support has been shifted.

42. In a machine of the character described, the combination of an accumulator, actuators for the respective members thereof, primary differential stops for limiting movement of said actuators, keys for positioning the primary stops to represent any desired number, secondary stops set by the actuators to represent the same number as that represented by the primary stops, means for locking the secondary stops after they have been so set, and means for causing the secondary stops to limit movement of the actuators.

43. In an adding machine, the combination of an accumulator, actuators for the respective members thereof, primary differential stops for limiting movement of said actuators, keys for positioning the primary stops to represent any desired number, secondary stops set by the actuators to represent the same number as that represented by the primary stops, means for locking the secondary stops after they have been so set, and means whereby each secondary stop set may limit movement of an actuator other than the one by which it was set.

44. In an adding machine, the combination of an accumulator, reciprocating actuators for the respective members thereof, primary differential stops for limiting movement of the actuators, keys for positioning the primary stops to represent any desired number, secondary stops set by the actuators to represent the same number as that represented by the primary stops, means for locking the secondary stops after they have been set, and means whereby the number aforesaid may be introduced into the accumulator through the instrumentality of a group of actuators including others than the ones whereby the secondary stops were set.

45. In an adding machine, the combination with adding mechanism, of a carriage, mechanical elements in said carriage adapted to be set to represent numbers, mechanism for operating said adding mechanism and at the same time setting said elements to represent a number, means for latching said elements in position to represent said number, means for unlatching said elements, and automatic means for restoring said elements to idle position when they are unlatched.

46. In an adding machine, the combination with adding mechanism, of a carriage, mechanical elements in said carriage adapted to be set to represent numbers, means for operating said adding mechanism and at the same time setting said mechanical elements to represent a number, a latch device for holding said mechanical elements, means for releasing said latch device, and means for restoring said mechanical elements to idle position.

47. The combination with recording mechanism, a paper carriage arranged to feed paper to said recording mechanism, and means for operating said recording mechanism to record numbers on paper in said paper carriage, of a carriage operable independently of said paper carriage, mechanical elements in said independent carriage adapted to be set to represent numbers, means for setting said mechanical elements incidentally to the operation of said recording mechanism to represent the number recorded, and a latch device holding said mechanical elements in position to represent said number.

48. The combination with recording mechanism operable to record numbers, means for operating said recording mechanism to record numbers, differential mechanism controlling the recording mechanism in the recording of the numbers aforesaid, and adding mechanism operated by said recording mechanism to add the numbers recorded as an incident to the recording thereof, of a carriage, elements in said carriage adapted to be set to represent numbers, means for setting said elements by the operation of the recording mechanism to represent the total of the numbers as said total is represented in said adding mechanism, additional adding mechanism, and means for operating said additional adding mechanism to represent the number or total represented by said elements.

49. The combination with recording mechanism operable to record numbers, differential mechanism controlling said recording mechanism in the recording of numbers, and adding mechanism operated by said recording mechanism to add the numbers recorded as an incident to the recording thereof, of a movable support, elements in said support adapted to be set to represent numbers, means for setting said elements by the operation of the recording mechanism to represent the total of numbers as said total is represented in said adding mechanism, additional adding mechanism, means for positioning said elements in coöperative relation to said additional adding mechanism, a series of actuators for actuating said additional adding mechanism, and means for operating said actuators and said additional adding mechanism under control of said elements whereby the number represented by said elements will be represented in said additional adding mechanism.

50. The combination with a series of adding wheels operable to add numbers, mechanism for operating said adding wheels to add numbers, an additional series of adding wheels operable to add numbers, and a series of actuators for actuating said additional series of wheels in adding operations, of elements settable by the mechanism for operating said first-named adding wheels to represent the number or total represented by said wheels, means for positioning said elements for coöperation with said actuators and said series of adding wheels, and means for operating said actuators and said second series of adding wheels under control of said elements effectively to introduce into said second series of wheels the number represented by said elements.

51. The combination with recording mechanism, a paper carriage arranged to feed paper to said recording mechanism, and means for operating said recording mechanism to record numbers on paper in said paper carriage, of mechanical elements adapted to be set to represent numbers, means for moving said paper carriage to different column spaces independently of said elements, means for setting said mechanical elements incidentally to the operation of said recording mechanism to represent the number recorded, adding mechanism, means for positioning said elements and said adding mechanism for coöperation, and mechanism for introducing in said adding mechanism the number represented by said elements and at the same time return said mechanical elements to idle position.

52. In an adding machine, the combination with adding and clearing mechanisms and means for operating said mechanisms in adding and clearing operations, of a carriage, a series of elements pivoted in said carriage, means for setting said elements by the operation of said adding and clearing mechanisms to represent the number or total cleared, a latch device holding said elements in their set positions, additional adding and clearing mechanisms, and means for coöperating said additional mechanisms with said elements to introduce in said additional adding mechanism the number represented by said elements.

53. In an adding machine, a series of pivoted elements, springs actuating said elements in one direction, mechanism for setting said elements to represent numbers, a releasable latch device operable to engage all of said elements and hold them in their set positions, adding mechanism, actuators for said adding mechanism, means for operating said actuators to operate said adding mechanism, and means for limiting movement of said actuators by said elements whereby the numbers represented by said elements will be introduced into said adding mechanism.

54. The combination with recording mechanism, a paper carriage feeding paper to said recording mechanism, and means for operating said recording mechanism, of an independent carriage, pivoted elements in said independent carriage adapted to be set to represent numbers, a latch device for holding said elements in position to represent numbers, and means for setting said elements to represent the number recorded by said recording mechanism and engaging said latch device with said elements.

55. The combination with recording mechanism, a paper carriage arranged to hold paper for said recording mechanism, and means for operating said mechanism to record numbers, of an independent carriage, pivoted elements in said independent carriage adapted to be set to represent numbers, means for setting said pivoted elements incidentally to the operation of said recording mechanism to represent the number recorded, means for setting said independent carriage and said pivoted elements to limit movement of a part of said recording mechanism in any position of said paper carriage, and means for operating said part of said recording mechanism to record the number represented by said elements.

56. In an adding machine, the combination with a movable carriage, elements in said carriage adapted to be set to represent numbers, mechanism for setting said elements to represent numbers while said carriage is stationary in one position, means for moving said carriage to another position after said elements have been set to represent any number, means for holding said carriage in its last-named position, adding mechanism, actuators for said adding mechanism, and means for coöperating said actuators with said carriage in the last-named position of said carriage to add the numbers represented by said elements.

57. In an adding machine, the combination with a movable carriage, elements in said carriage adapted to be set to represent numbers, mechanism for setting said elements to represent numbers while said carriage is stationary in one position, means for moving said carriage to another position after said elements have been set to represent any number, means for holding said carriage in its last-named position, adding mechanism, actuators for said adding mechanism, means for coöperating said actuators with said carriage in the last-named position of said carriage to add the numbers represented by said element, and means for restoring said elements to idle position.

58. In an adding machine, the combination with a carriage, elements in said carriage settable to represent numbers, means for holding said carriage stationary in one position, means for setting said elements to represent a number while said carriage is stationary in the position aforesaid, means for moving said carriage to another position, means for holding said carriage stationary in the last-named position, adding mechanism, and actuators for said adding mechanism under control of said elements whereby the number represented by said elements will be introduced into said adding mechanism by the operation of said actuators.

59. The combination with type-carriers, a paper carriage arranged to hold paper for said type-carriers, and means for operating said type-carriers to record numbers, of an independent carriage, elements in said independent carriage adapted to be set to represent numbers, means for setting said elements incidentally to the operation of said type-carriers, to represent the number recorded, means for latching said elements in position to represent said numbers, and means for adding the numbers represented by said elements and automatically restoring said elements to idle position.

60. The combination with adding mechanisms, and means for operating said adding mechanisms to add separate lists of items and retain separate totals thereof, of a carriage, mechanism for clearing one of said adding mechanisms and at the same time setting up in said carriage the number or total cleared, and automatic means for shifting said carriage to position to coöperate with another adding mechanism.

61. The combination with separately operable adding mechanisms, and means for operating said adding mechanisms to add separate lists of numbers and to retain separate totals thereof, of a paper carriage, recording and clearing mechanisms operable to record on paper in said carriage any one or more of said totals and to clear said adding mechanisms, a carriage independent of said paper carriage, elements in said independent carriage operated incidentally to the clearing operation to represent one of the totals cleared, and means for adding together the numbers so represented in said independent carriage.

62. The combination with adding mechanisms, means for operating said adding mechanisms to add separate lists of items and at the same time retain separate totals thereof, recording mechanism, and a paper carriage arranged to hold paper for said recording mechanism, of an independent carriage, means for clearing one of said adding mechanisms and at the same time setting up in said independent carriage the number or total cleared, and mechanism for coöperating said independent carriage and another of said adding mechanisms to add the number represented in said independent carriage to the number or total represented in said other adding mechanism.

63. The combination with a carriage, a series of pivoted plates in said carriage, springs engaging and actuating said plates toward idle position, means for setting said pivoted plates to represent numbers, means for latching said plates in position to represent numbers, and means for recording and adding said numbers.

64. The combination with a carriage, pivoted plates in said carriage, springs engaging and actuating said plates toward idle position, means for operating said pivoted plates to represent numbers, a latch device for holding all of said pivoted plates, means for recording the numbers represented by said plates, and means for releasing said latch device.

65. The combination with adding mechanism, racks movable in one direction to actuate said adding mechanism in adding operations, and means for causing said racks to clear said adding mechanism by movement in the opposite direction, of a carriage, and means for transferring any number from said adding mechanism to said carriage while said racks are moving in the last-named direction to clear said adding mechanism, substantially as specified.

66. The combination with adding mechanism, and means for operating said adding mechanism to add numbers, of mechanism for recording the number represented in said adding mechanism, a carriage, and means under control of said recording mechanism for setting up in said carriage the number represented in said adding mechanism as an incident to and prior to the recording of said number.

67. The combination with a series of adding wheels, a series of racks for actuating said adding wheels, means for moving said racks in one direction to actuate said adding wheels in adding operations, means for moving said racks in the opposite direction while in engagement with said adding wheels in clearing operations, a carriage, and mechanical elements in said carriage settable by operation of the racks in the last-named direction in clearing operations to represent the number cleared from said adding wheels.

68. The combination with a series of adding wheels, a carriage, and a series of mechanical elements in said carriage settable to represent numbers, of a series of racks, means whereby said racks will set said adding wheels to represent numbers while said racks are moving in one direction, and means whereby said racks will set said mechanical elements to represent numbers while moving in the opposite direction, substantially as specified.

69. In an adding machine, the combination with a series of adding wheels settable to represent numbers, and a series of separate mechanical elements also settable to represent numbers, of a series of actuators for said adding wheels and said mechanical elements, and mechanism for moving said actuators in one direction effectively to set said adding wheels in adding operations and in the opposite direction to set said elements to represent numbers, substantially as specified.

70. The combination with a series of adding wheels, a series of racks for actuating said adding wheels, means for moving said racks in one direction to actuate said adding wheels in adding operations, and means for moving said racks in the opposite direction while in engagement with said adding wheels in clearing operations, of a carriage shiftable to coöperate with selected ones of said wheels and racks, and mechanical elements in said carriage settable by operation of the selected racks in clearing operations to represent the number cleared from said adding wheels.

71. In an adding machine, the combination with a series of racks, and series of adding wheels controlled by said racks in adding and clearing operations, of a carriage settable to coöperate with selected series of said racks and adding wheels, and elements in said carriage settable by operation of said racks in clearing operations to represent the number cleared from said wheels.

72. In an adding machine, a carriage, elements in said carriage adapted to be set to represent numbers, means for holding said carriage stationary in one position, mechanism for setting one or more of said elements, as desired to represent an equal number of digits while said carriage is stationary, and additional means for restoring said elements to idle position.

73. In an adding machine, a movable carriage, means for holding said carriage stationary in different positions, elements in said carriage, mechanism for setting said elements to represent numbers while said carriage is stationary in one position, and mechanism controlled by said elements for adding said numbers while said carriage is stationary in another position.

74. In an adding machine, a carriage, means for holding said carriage stationary in different selected positions, a group of elements in said carriage, and means for setting said group of elements to represent numbers while said carriage is stationary in one or another of said selected positions.

75. In an adding machine, a carriage, means for holding said carriage stationary in different selected positions, a series of elements in said carriage arranged in numerical orders and adapted to be set to represent numbers, and mechanism for setting a plurality of said elements including the element in units order and adjacent to higher orders while said carriage is stationary in either one of two positions.

76. In an adding machine, a carriage, elements arranged in numerical orders in said carriage and adapted to be set to represent numbers, means for holding said carriage stationary in different selected positions, means for setting said elements to represent numbers while said carriage is held stationary in any one of a number of positions, and means for recording the number represented by said elements while said carriage is stationary in another position.

77. In an adding machine, a carriage, elements arranged in numerical orders in said carriage and adapted to be set to represent numbers, means for holding said carriage stationary in one position, mechanism for setting a plurality of said elements to represent the digits of numbers while said carriage is stationary in the position aforesaid, means for holding said carriage stationary in another position, and mechanism controlled by said elements while said carriage is in the last-named position for adding the numbers successively represented by said elements.

78. In an adding machine, a carriage, elements in said carriage adapted to be set to represent numbers, means for holding said carriage stationary in one position, mechanism for setting said elements to represent the digits of numbers while said carriage remains stationary in the position aforesaid, means for holding said carriage stationary in another position, and recording mechanism controlled by said carriage in said last-named position for recording the number represented by said elements.

79. In an adding machine, a movable carriage, elements in said carriage adapted to be set to represent numbers, means for setting a selected number of said elements to represent the digits of a number while said carriage remains stationary in one position, means for moving said carriage to another position after said elements have been set as aforesaid, and adding and recording mechanisms under control of said elements in said last-named position operable to add and record numbers successively represented by said elements as aforesaid.

In witness whereof, I have signed my name to this specification in the presence of two subscribing witnesses.

HARRY LANDSIEDEL.

In the presence of—
R. D. BRYARS,
A. E. HOWELL.

Copies of this patent may be obtained for five cents each, by addressing the "Commissioner of Patents, Washington, D. C."